United States Patent
Lam et al.

(10) Patent No.: US 10,802,566 B1
(45) Date of Patent: Oct. 13, 2020

(54) TWO-PART INTERFACE PHY FOR SYSTEM-ON-CHIP DEVICES

(71) Applicant: Synopsys, Inc., Mountain View, CA (US)

(72) Inventors: Andrew Chung Chun Lam, Vaughan (CA); Davit Petrosyan, Oakville (CA); Dino A. Toffolon, Stoney Creek (CA); Morten Christiansen, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 146 days.

(21) Appl. No.: 16/028,887

(22) Filed: Jul. 6, 2018

Related U.S. Application Data

(60) Provisional application No. 62/529,374, filed on Jul. 6, 2017.

(51) Int. Cl.
  *G06F 1/3225* (2019.01)
  *G06F 1/3234* (2019.01)
  *G06F 1/3218* (2019.01)

(52) U.S. Cl.
  CPC .......... *G06F 1/3225* (2013.01); *G06F 1/3218* (2013.01); *G06F 1/3265* (2013.01); *G06F 1/3275* (2013.01)

(58) Field of Classification Search
  CPC .... G06F 1/3225; G06F 1/3218; G06F 1/3265; G06F 1/3275

(Continued)

(56) References Cited

U.S. PATENT DOCUMENTS 5,113,097 A * 5/1992 Lee ................. H03K 19/018521
  257/351
5,781,026 A * 7/1998 Chow .............. H03K 3/356147
  326/26

(Continued)

FOREIGN PATENT DOCUMENTS

WO 2014/004896 A1 1/2014
WO 2017/112094 A1 6/2017

OTHER PUBLICATIONS

Universal Serial Bus Specification Revision 2.0 Apr. 27, 2000 (Year: 2000).*

(Continued)

*Primary Examiner* — Paul R. Myers
(74) *Attorney, Agent, or Firm* — Bever, Hoffman & Harms, LLP

(57) ABSTRACT

A two-part interface PHY configuration includes a low-voltage PHY portion configured for instantiation on an SoC device fabricated using a cutting-edge technology node, and a high-voltage PHY portion configured for instantiation on a power management device (PMD) fabricated using a high-voltage technology node. The low-voltage PHY portion includes interface control and low-voltage I/O circuitry configured to transfer outgoing 3.3V data signals to the high-voltage PHY portion at low voltage levels, and the high-voltage PHY portion includes a driver circuit that retransmits the low-voltage data signals onto a bus at the required 3.3V level. Incoming 3.3V data signals pass through an attenuator circuit before being processed using a receiver circuit provided on the low-voltage PHY portion. In USB applications, outgoing USB High Speed data signals are generated by a driver circuit provided on a low-voltage USB PHY portion.

20 Claims, 7 Drawing Sheets

(58) Field of Classification Search
USPC .......................................................... 713/300
See application file for complete search history.

(56) References Cited

U.S. PATENT DOCUMENTS

| | | | | |
|---|---|---|---|---|
| 6,043,679 | A * | 3/2000 | Kwon | ............ H03K 19/018521 |
| | | | | 326/68 |
| 7,522,659 | B2 | 4/2009 | Lacy et al. | |
| 7,555,741 | B1 * | 6/2009 | Milton | .................... G06F 30/34 |
| | | | | 716/101 |
| 9,239,810 | B2 | 1/2016 | Chen et al. | |
| 9,552,051 | B2 | 1/2017 | Elias et al. | |
| 9,606,955 | B2 * | 3/2017 | Chen | .................... G06F 13/385 |
| 2001/0011917 | A1 * | 8/2001 | Kim | ................ H03K 3/356113 |
| | | | | 327/333 |
| 2001/0043092 | A1 * | 11/2001 | McDaniel | ........ H03K 19/00315 |
| | | | | 327/108 |
| 2007/0206630 | A1 * | 9/2007 | Bird | ........................ H04L 41/24 |
| | | | | 370/465 |
| 2008/0280656 | A1 * | 11/2008 | Gonikberg | ........ H04W 52/0283 |
| | | | | 455/572 |
| 2013/0049838 | A1 * | 2/2013 | Mueller | .................... G05F 1/56 |
| | | | | 327/306 |
| 2013/0155046 | A1 * | 6/2013 | Xu | ........................ G09G 5/006 |
| | | | | 345/212 |
| 2014/0149609 | A1 * | 5/2014 | Chan | .................... G06F 13/385 |
| | | | | 710/16 |
| 2015/0227489 | A1 * | 8/2015 | Chen | .................... G06F 13/385 |
| | | | | 710/313 |
| 2016/0162427 | A1 * | 6/2016 | Kang | .................... G06F 13/387 |
| | | | | 710/313 |
| 2016/0269126 | A1 * | 9/2016 | Maung | .................. H04B 10/25 |
| 2016/0285757 | A1 * | 9/2016 | Srivastava | ............. H04L 12/10 |
| 2017/0286360 | A1 * | 10/2017 | Srivastava | .......... G06F 13/4295 |
| 2018/0189222 | A1 * | 7/2018 | Srivastava | ............ G06F 13/287 |
| 2020/0034323 | A1 * | 1/2020 | Maung | ................. G06F 13/382 |

OTHER PUBLICATIONS

Genesys Logic, Inc., Datasheet entitled "GL3522-22 USB 3.0 Hub Controller", Revision 1.03, Sep. 24, 2014, 32 pages.

* cited by examiner

| FSLSD | FSLSOE | SPEED MODE | DP PULLUP | DP | DM | COMMENT |
|---|---|---|---|---|---|---|
| 0 | 0 | X | 0 | -- | -- | DP PULLUP DISENGAGED |
| 1 | 0 | X | 1 | -- | -- | DP PULLUP ENGAGED |
| 0 | 1 | LS | 0 | 1 | 0 | LOW SPEED K |
| 1 | 1 | LS | 0 | 0 | 1 | LOW SPEED J |
| 0 | 1 | FS | 0 | 0 | 1 | FULL SPEED K |
| 1 | 1 | FS | 0 | 1 | 0 | FULL SPEED J |

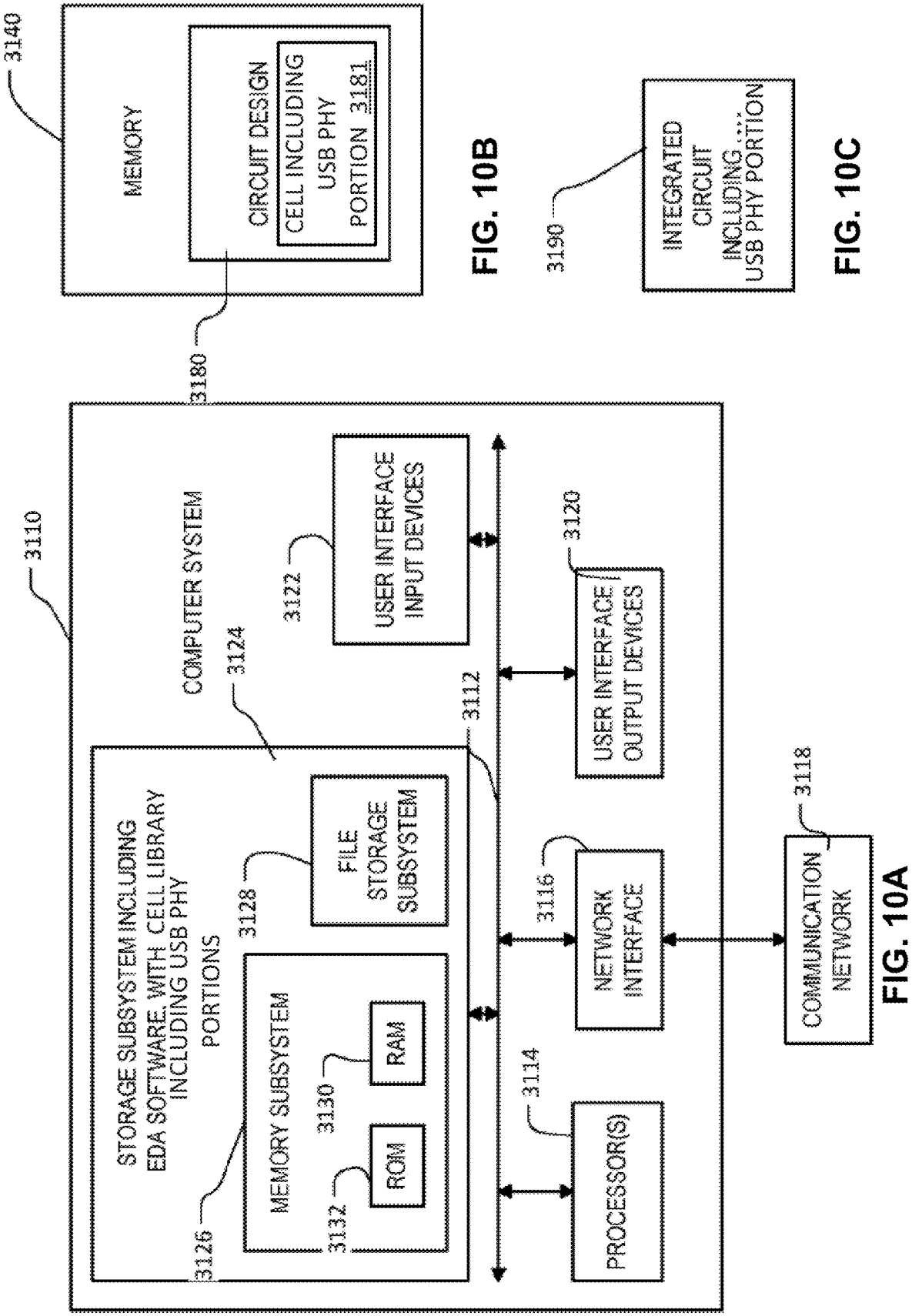

TWO-PART INTERFACE PHY FOR SYSTEM-ON-CHIP DEVICES

RELATED APPLICATIONS

This application claims priority from U.S. Provisional Patent Application 62/529,374, entitled "USB2.0 PHY design which does not require SoC 3.3V supply", which was filed on Jul. 6, 2017, and is incorporated by reference herein.

FIELD OF THE INVENTION

The present disclosure generally relates to electronic systems including one or more integrated circuit (IC) devices, and more specifically to electronic systems including System-On-Chip (SoC) devices that are compliant with USB and other interface standards.

BACKGROUND OF THE INVENTION

Modern System-on-Chip (SoC) devices are required to support Universal Serial Bus 2.0 (USB 2.0) connectivity. USB 2.0 is an industry recognized protocol developed to handle both communication and electrical power transfer between two computer devices, and is implemented in essentially all computing devices in operation today. Therefore, in order to facilitate communications with other computing devices, SoC designers must include in their new SoC designs circuitry capable of interfacing between the SoC's processor (or other communication circuit on the SoC) and a USB receptacle in a manner that complies with all USB 2.0 communication protocols. This requirement also extends to electronic systems and SoC devices that implement USB standards like USB 3.0, USB 3.1, USB 3.2 and future USB standards in which backwards compatibility with USB 2.0 standard is mandatory.

For cost, power and area reasons, SOC designers typically meet the USB 2.0 support requirement by integrating a USB 2.0 PHY into their SoC designs during the design phase of an SoC manufacturing process. The term "USB 2.0 PHY" refers to a pre-designed circuit block that is configured to process communications passed between a SoC processor and a standard USB receptacle using USB 2.0 protocols. USB 2.0 PHYs are typically designed by electronic design automation (EDA) software tool providers and/or fabrication facility operators such that a given USB 2.0 PHY description includes all details required to fabricate the USB 2.0 PHY using a target fabrication process (technology node). The completed USB 2.0 PHY description is then saved using a known software-based (e.g., cell, or "cell" as used herein) format, and the cell including the USB 2.0 PHY description is then stored in a cell library that is accessible by EDA software tools. During the design phase of a SoC design and fabrication process, a SoC designer is able to instantiate (i.e., transfer a copy of) the USB 2.0 PHY cell into his/her SoC design at an appropriate location (e.g., connected between the SoC's processor and designated USB bus terminals). During subsequent testing and verification phase of the SoC design and fabrication process, the instantiated USB 2.0 PHY cell provides all relevant performance information required to verify proper connection and operation of the USB 2.0 PHY during system operations. During subsequent layout and fabrication portions of the SoC design and fabrication process, the instantiated USB 2.0 PHY cell provides all layout details required to produce a physical USB 2.0 PHY circuit structure using the target technology node such that the subsequently fabricated SoC's processor (or other communication circuit on the SoC) is capable of communicating with external devices by way of a USB receptacle, which is subsequently operably connected to the USB bus terminals of the finished SoC chip during a packaging/assembly portion of the SoC manufacturing process. Accordingly, the use of a cell including the pre-generated USB 2.0 PHY description eliminates the need for SoC designers to design and verify a suitable USB PHY from scratch, thereby reducing system development time and overall manufacturing costs.

More recently, SoC designers have encountered a conflict between developing SoCs for production using cutting-edge technology nodes SoCs and the convenient use of conventional USB 2.0 PHYs to meet the USB 2.0 support requirement. The phrase "technology node" (also process node, process technology or simply node) refers to a specific semiconductor manufacturing process and its associated design rules, with the particular node being designated by a numeric designation (e.g., "22 nm", "10 nm", "7 nm" and "5 nm"). Generally, a node's numeric designation relates to the smallest feature size that may be produced by the node, where smaller feature sizes produce smaller transistors that are both faster and more power-efficient, with the lowest numeric designations typically identifying the most cutting-edge technology nodes. Accordingly, modern SoC devices are typically designed for production using cutting-edge technology nodes having the lowest numeric designations in order to take advantage of both the best-available cost-saving and power-efficiency benefits. The conflict between producing modern SoCs using these cutting-edge technology nodes while also meeting the USB 2.0 support requirement is that most cutting-edge technology nodes cannot support the legacy voltage requirements associated with the USB 2.0 protocol. That is, conventional High Speed USB 2.0 PHY designs are configured to support legacy speed modes (Low Speed and Full Speed) whose voltage swing is 3.3V, and a requirement established by earlier USB protocols for the PHY to tolerate 5V. In contrast, many cutting-edge technology nodes do not support voltage levels above 2V (e.g., it is not possible to produce transistors using the 5 nm node that are capable of generating the 3.3V signals required for Full Speed and Low Speed USB communication protocols). Accordingly, there is a need for a new USB 2.0 PHY configuration that can both satisfy the low-voltage constraints of cutting-edge technology nodes and meet the legacy voltage requirements of the USB 2.0 protocol.

Several conventional approaches have been developed to address the USB legacy voltage problem set forth above, but all of these conventional approaches have significant disadvantages or are simply impractical. A classic conventional approach would be to utilize transistor cascading, but this approach proved to be challenging to implement, and cannot be implemented using cutting edge SoC fabrication process flows. A second approach involves utilizing an Embedded USB2 (eUSB2) repeater, which consists of a eUSB2 transceiver and a USB 2.0 transceiver connected back to back with appropriate control logic, that is either fabricated as a discrete circuit or integrated into an SoC's power management unit (PMU). A problem with this second approach is that the eUSB2 repeater requires significant changes to existing USB 2.0 PHYs in order to implement this solution. Also, the eUSB2 repeater solution has significant area and power increase compared to conventional USB 2.0 PHYs. Other conventional approaches involved utilizing either an UTMI+ Low Pincount Interface (ULPI) or a High-Speed Inter-Chip interface, but these approaches also required fabrication as discrete devices or integration into a PMD, are either incomplete or require significant changes to existing USB 2.0 PHYs in order to establish operable communication with the host SoC.

What is needed is a modified PHY solution that can be easily incorporated into SoC devices produced using cutting-edge (low-voltage) technology nodes, and is capable of supporting legacy (e.g., 3.3V) voltage requirements set by existing interface standards.

SUMMARY OF THE INVENTION

The present invention addresses the problem presented above in the context of a system including an interface standard (e.g., USB 2.0 or higher) compliant System-on-Chip (SoC) device and an associated power management device (PMD) by way of providing a two-part PHY configuration including a low-voltage (first) PHY portion integrally fabricated as part of the SoC, and a high-voltage (second) PHY portion integrally fabricated as part of the associated PMD. The low-voltage PHY portion includes control (digital) and input/output circuitry of a conventional interface PHY that can be implemented using low-voltage (i.e., less than 2V, e.g., 1.8V or 1.2V) circuit elements producible by a cutting-edge (i.e., 5 nm) technology node utilized to fabricate the SoC device, and the high-voltage PHY portion includes 3.3V (high-voltage) circuitry of a conventional interface PHY that cannot be implemented using the low-voltage circuit elements of the cutting-edge technology node utilized to fabricate the SoC device. That is, the PMD and the high-voltage PHY portion are simultaneously fabricated using any (second) technology node capable of supporting high legacy voltage levels that cannot be supported by the cutting-edge technology node utilized to fabricate the SoC device. Accordingly, the two-part PHY configuration of the present invention facilitates retaining substantial portions of a conventional PHY design (e.g., a digital USB control circuit and low-voltage USB I/O communication operations in the case of USB applications) on the SoC device, whereby these components benefit from the power efficiency and smaller size benefits provided by the cutting-edge technology node. In addition, by providing a low-voltage bus to transfer legacy high-voltage signals (e.g., Full Speed and Low Speed USB data transmissions in the case of USB) to the high-voltage PHY portion fabricated on the PMD at relatively low maximum voltage levels, and by configuring the high-voltage PHY portion to re-transmit these legacy high-voltage data signals onto a standard bus at the required higher maximum voltage signal level (e.g., at least 1V higher than the relatively low voltage levels), the two-part PHY configuration of the present invention satisfies legacy 3.3V operating requirements without requiring the SoC device to receive 3.3V sources or signals.

According to exemplary USB-based embodiments, data signals received from external sources on a standard USB bus are attenuated before being passed to a receiver circuit implemented on a low-voltage USB PHY portion. In one embodiment, an attenuation circuit is implemented at part of a high-voltage USB PHY portion (i.e., on the power management device), and utilizes pass gates to attenuate incoming 3.3V Full Speed and Low Speed USB data signals such that they are passed at attenuated voltage levels (e.g., 1.8V or less) to the receiver circuit by way of low-voltage data lines. In other embodiments, the attenuation circuit is implemented either as a discrete integrated circuit chip or as part of the low-voltage USB PHY portion (i.e., on the SoC device). By attenuating incoming Full Speed and Low Speed signals (i.e., to reduce the maximum signal voltage levels from 3.3V to 1.8V or less) such that the attenuated Full Speed and Low Speed signals can be safely received by the low-voltage I/O subsystem, the present invention facilitates implementing both the USB control circuit and the USB receiver circuit of a conventional USB 2.0 PHY on the host SoC with minimal changes to the existing USB 2.0 PHY design, thereby reducing overall SoC production costs by greatly simplifying and shortening the design phase of the SoC production process.

According to one or more embodiments, a High Speed driver circuit is implemented on the low-voltage USB PHY portion to implement High Speed USB data transmissions. Implementing the High Speed driver circuit on the low-voltage USB PHY portion is easily implemented on an existing USB 2.0 PHY design by way of disabling/removing transmission circuitry associated with Full Speed and Low Speed transmission, and retaining the pull-up and pull-down transistors and associated control circuitry utilized to perform High Speed data transmissions. In combination with the retention of the receiver circuit, implementing the High Speed driver circuit on the low-voltage USB PHY portion further minimizes changes to the existing USB 2.0 PHY design, thereby further reducing overall SoC production costs.

According to a specific embodiment, Full Speed and Low Speed USB data transmissions are transferred from the low-voltage USB PHY portion to the high-voltage USB PHY portion using a two-pin bus and control circuitry that also facilitates applying a suitable bias voltage to the USBDP signal lines during other operations. Specifically, the high-voltage USB PHY portion utilizes logic gates and associated pairs of pull-up transistors and/or pull-down transistors to generate 3.3V data signals on standard USB data bus lines when an output enable signal received from the low-voltage USB PHY portion is asserted, and to apply a suitable pull-up voltages onto the USBDP signal line of the standard USB bus when the output enable signal received from the low-voltage USB PHY portion is de-asserted. This configuration both facilitates moving 3.3V operations off of the SoC device, and also optimizes USB bus operations while requiring a minimum number of pins.

According to a presently preferred embodiment, the above-mentioned attenuation circuit, which is utilized to attenuate incoming Full Speed and Low Speed USB data signals such that they are received by the receiver circuit disposed on a SoC device at safe voltage levels, is implemented as part of the high-voltage USB PHY (i.e., on the PMD). In an alternative embodiment, the attenuation circuit is implemented on a discrete component (i.e., disposed on an integrated circuit chip that is external to both the SoC and the PMD) in order to reduce the number of pins required on the PMD. In yet another alternative embodiment, the attenuation circuit may be safely implemented as part of the low-voltage USB PHY (i.e., on the SoC device) in order to avoid the need for external components, thereby simplifying the system assembly process.

According to alternative practical embodiments, the two-part PHY configuration of the present invention is implemented in various associations with an EDA software tool that is configured to execute the design phase of a design and fabrication process utilized to produce electronic systems that include at least one SoC device and an associated PMD. In one embodiment, the two-part PHY configuration is implemented as electronic structure (e.g., a computer or system programmed to execute the EDA software tool) including a cell library containing a first cell including the low-voltage PHY portion, and a second cell including the high-voltage PHY portion. In another embodiment, the two-part PHY configuration is implemented as a cell library (computer program product) containing the two cells mentioned above. In yet another embodiment, the two-part PHY configuration is implemented as a system in which the low-voltage PHY portion is implemented on an SoC device fabricated using a cutting-edge, low-voltage technology node, and the high-voltage PHY portion is implemented on a PMD fabricated using an appropriate high-voltage technology node. The present invention also applies to system design methodologies that implement the spirit and scope of the two-part PHY configuration described herein.

BRIEF DESCRIPTION OF THE DRAWINGS

These and other features, aspects and advantages of the present invention will become better understood with regard to the following description, appended claims, and accompanying drawings, where:

FIGS. 10A, 10B and 10C are simplified block diagrams of a computer system suitable for use with embodiments of the technology, as well as circuit design and circuit embodiments of the technology.

DETAILED DESCRIPTION OF THE DRAWINGS

The present invention relates to an improved interface PHY configuration for use in the production of SoCs using cutting-edge technology nodes. The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to provide a thorough understanding of one or more of the exemplary embodiments. In the interest of not obscuring the presentation of embodiments of the claimed inventions, in the following Detailed Description, some processing steps or operations that are known in the art may have been combined together for presentation and for illustration purposes and in some instances may have not been described in detail. However, a person skilled in the art will recognize that these embodiments may be used in commerce without these specific details or with equivalents thereof. In other instances, well-known processes and devices are not described in detail as not to unnecessarily obscure aspects of these embodiments. In other instances, some processing steps or operations that are known in the art may not be described at all. The following description is instead focused on the distinctive features or elements of various embodiments of the claimed inventions. Furthermore, while this description may refer to some components of the structure in the singular tense, more than one component may be depicted throughout the figures and like components are labeled with like numerals.

Figure 1:
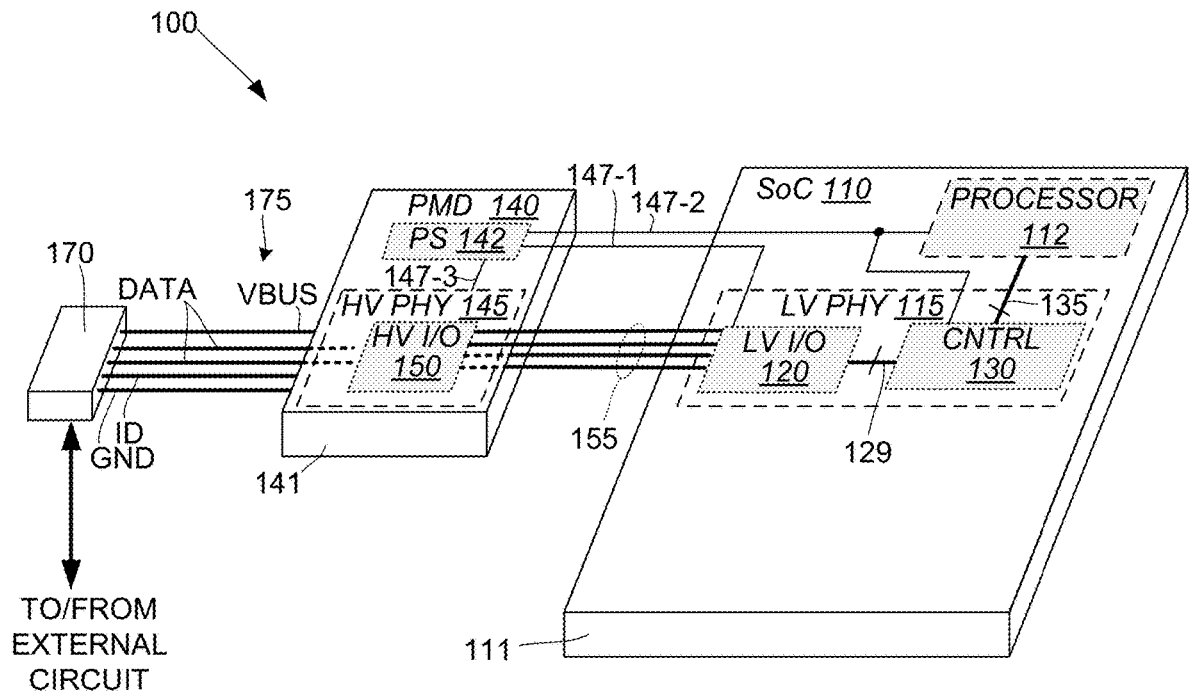
FIG. 1 is a top side perspective view showing a system implementing a two-part interface PHY configuration in accordance with a generalized embodiment of the present invention.

FIG. 1 depicts a simplified system 100 designed/fabricated using a two-part PHY configuration according to a generalized embodiment of the present invention. The depiction of system 100 in FIG. 1 (along with the various system embodiments shown in the figures described below) is intended to represent either electronically stored circuit designs that may be converted into corresponding physical devices, for example, using fabrication process flow described below with reference to FIG. 9, or to the physical devices fabricated in accordance with the circuit designs. In particular, all details of the two-part PHY configuration provided below are intended to refer either to circuit design details operably stored in the form of associated cells (e.g., standard cells or other suitable storage formats), or to physical integrated circuit devices fabricated using an associated technology node in accordance with the associated circuit design.

System 100 generally includes a System-on-Chip (SoC) device 110 and an associated power management device (PMD) 140. SoC device 110 represents a single integrated circuit device that integrates computer and other electronic systems to perform some or all operations required by system 100, and includes at least one processor 112, memory, and input/output circuitry that are all fabricated using a selected technology node on an associated semiconductor chip 111. Processor 112 is configured to implement data communications with an external device by way of USB 2.0 or another interface standard protocol using the two-part PHY configuration described herein. PMD 140 (e.g., a power management unit (PMU) or a power management integrated circuit (PMIC)) is a device configured using known techniques to provide one or more supply voltages by way of associated lines (e.g., lines 147-1 and 147-2) to SoC device 110 during the operation of system 100. According to an aspect of the present invention, SoC device 110 and PMD 140 are fabricated using two different technology nodes, where SoC device 110 is fabricated using a low-voltage "cutting-edge" technology node (e.g., 5 nm) that does not support 3.3V operations, and PMD 140 is fabricated using a technology node that does support 3.3V operations. Otherwise, SoC 110 and PMD 140 are designed in parallel such that, when operably interconnected in the manner depicted in FIG. 1 and PMD 140 is coupled to a suitable power supply (e.g., a battery, not shown), PMD 140 supplies power to SoC 110 in a manner that facilitates the intended operation of SoC 110. Other than the details provided below regarding the two-part PHY configuration of the present invention, SoC device 110 and PMD 140 are configured using known circuit design techniques to implement a desired system operation, and therefore further details of SoC and PMD 140 are omitted herein for brevity.

System 100 is further configured to meet include a receptacle 170 that is operably coupled to processor 112 of SoC device 110 by way of an interface standard bus 175 and the two-part PHY configuration, which is described below. In one embodiment, both USB receptacle 170 and bus 175 are conventional USB structures (e.g., meet all USB 2.0 standards), and processor 112 is configured to transmit and receive data by way of receptacle 170 in accordance with established techniques. That is, all modifications to the signal processing protocol performed during data transmission operations and data reception operations are implemented within the two-part configuration, whereby the two-part PHY configuration of the present invention may be implemented with no change to existing processor technology). Note that only data signal lines of standard bus 175 are discussed herein. For example, when standard bus 175 is a USB bus, control and power lines such as the VBUS, ID and GND (ground) lines of bus 175 are maintained in accordance with known techniques using circuitry provided on PMD 140, and therefore are not discussed in additional detail herein for brevity. In contrast, the one or more standard data signal lines (DATA) of bus 175 (e.g., lines USBDP and USBDM used by USB interface standards) are connected between PMD 140 and receptacle 170 such that data communications are passed between receptacle 170 and processor 112 by way of the two-part PHY configuration as described below.

In the generalized embodiment of FIG. 1 system 100 is depicted as a multi-chip configuration, with SoC device 110 fabricated on associated (first) discrete semiconductor chip 111, and PMD 140 fabricated on associated (second) discrete semiconductor chip 141. This multi-chip configuration is utilized for exemplary purposes to emphasize that SoC 110 and power management device 140 are fabricated using two different technology nodes. Specifically, SoC 110 is produced using a cutting-edge technology node configured to generate integrated circuit elements that operate at relatively low voltages (i.e., below 2V), whereas power management device 140 is produced using a technology node suitable for managing power supplied to SoC 110 during operation, which typically requires integrated circuit elements capable of being subjected to relatively high voltages (i.e., 3.3V and above) without incurring damage. Although the fabrication of two integrated circuit devices using two different technology nodes typically results in the production of two separate chips that must be subsequently interconnected, such as chips 111 and 141 in FIG. 1, it is also possible to generate both SoC 110 and PMD 140 on a single monocrystalline silicon chip using, for example, Bipolar-CMOS-DMOS (BCD) process technology, which is a relatively new processing technology that facilitates the fabrication of digital, analog and power devices on a single wafer (chip) by way of combining CMOS, Bipolar, and DMOS (high power) processes. Note that the Bipolar, CMOS and DMOS processes of a given BCD process technology are considered separate technology nodes, whereby a single-chip system including both an SoC device that is fabricated using a BCD process' CMOS node and a PMD that is fabricated using the BCD process' DMOS nodes are considered. Accordingly, the appended claims are not intended to be limited to the two-chip configuration show in FIG. 1 unless otherwise specified.

According to an aspect of the present invention, the two-part PHY configuration includes a first PHY portion 115 that forms an integral part (i.e., is simultaneously fabricated on the same semiconductor chip with) SoC 110, and a second PHY portion 145 that forms an integral part of PMD 140. First PHY portion 115 includes a (first) low-voltage input/output circuit 120 that is powered by a suitable low voltage (i.e., less than 2V, e.g., 1.8V, 1.2V or 0.4V, transmitted by way of line 147-2), and a control circuit 130 that is also powered by a suitable low voltage transmitted by way of line 147-2. Control circuit 130 is operably coupled to low-voltage USBIO circuit 120 by way of a suitable bus 129 (e.g., in the case where the two-part PHY configuration supports a USB 2.0 interface standard, commonly using a Universal Transceiver Macrocell Interface (UTMI or UTMI+) bus protocol), and is operably coupled to processor 112 by way of a suitable communication bus 135. Second PHY portion 145 includes a high-voltage (second) input/output circuit 150 powered by a suitable high voltage (e.g., 3.3V transmitted by way of line 147-3), and is operably coupled to both receptacle 170 by way of the data signal lines of bus 175, and to low-voltage (first) input/output circuit 120 by way of a transfer signal line FSLSD of a low-voltage bus 155, which is connected between PMD 140 and SoC 110.

According to an aspect of the present invention, input/output circuits 120 and 150 are cooperatively configured to perform high-voltage (e.g., 3.3V) data transmissions according to associated interface standard protocols by configuring low-voltage input/output circuit 120 to transfer the outgoing attenuated data signals via low-voltage bus 155 to second input/output circuit 150, and by configuring second input/output circuit 150 to convert the attenuated (low-voltage) outgoing data signals into non-attenuated interface-standard (e.g., 3.3V) data signals for transmission onto data signal lines of bus 175. Specifically, first input/output circuit 120 is configured to receive outgoing data signals from control circuit 130 during associated data transmission operations, and is further configured to transmit these outgoing data signals at low (first) voltage levels (e.g., less than 2V) onto transfer signal line FSLSD. In addition, low-voltage input/output circuit 150 is configured to receive the low-voltage outgoing data signals from transfer signal line FSLSD, and includes a driver circuit that is operably configured to immediately re-transmit the outgoing data in the form of corresponding high-voltage (e.g., 3.3V) data signals on the data signal lines of bus 175, whereby the outgoing data is transmitted to an external circuit (not shown) by way of receptacle 170. In this way, the two-part PHY configuration of the present invention both meets high output voltage legacy requirements of a selected interface standard (e.g., the 3.3V legacy requirement of USB 2.0, which is associated with Full Speed and Low Speed data transmissions), and prevents the circuitry formed on SoC device 110 from being subjected to the required high legacy voltage level of the outgoing data signals.

Figure 2:
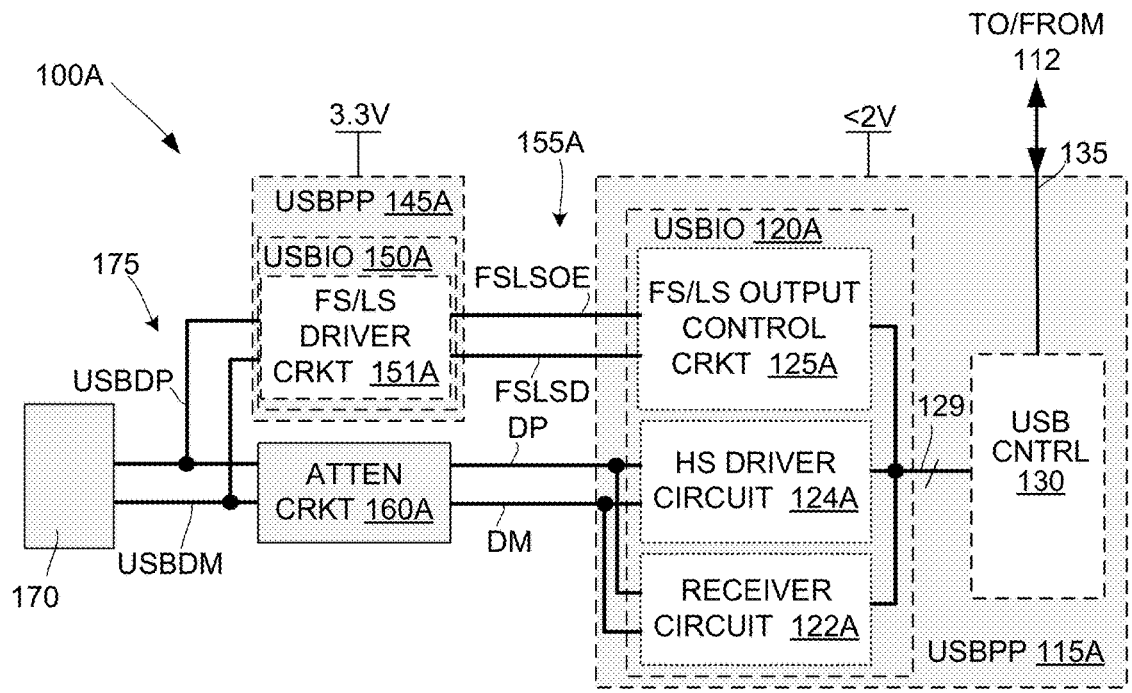
FIG. 2 is a block diagram showing a two-part USB PHY configuration according to an exemplary embodiment of the present invention.

FIG. 2 shows a partial system 100A including a two-part USB PHY arrangement in accordance with an exemplary embodiment in which the present invention is described in additional detail with specific reference to the USB 2.0 interface standard. Note that cell/circuit structures utilized in the USB arrangement of FIG. 2 are similar to those described above with reference to FIG. 1 are indicated with the same reference number followed by the letter "A". As such, system 100A includes a low-voltage USB PHY portion (USBPP) 115A including a USB control circuit (USB CNTRL) 130 and a USB input/output circuit (USBIO) 120A, and a high-voltage USBPP 145A including a USB input/output circuit (USBIO) 150A, where USBPPs 115A and 145A are understood to be respectively formed on a SoC device and a PMD in the manner illustrated in FIG. 1 (i.e., SoC device 110 and PMD 140 of FIG. 1 are omitted in FIG. 2 for clarity).

System 110A is similar to the generalized embodiment shown in FIG. 1 in that USBIO circuit 120A includes a Full-Speed/Low-Speed (FS/LS) output control circuit 125A that functions to relay Full Speed and Low Speed USB data signals as low-voltage (attenuated) USB data signals to USBIO circuit 150A by way of transfer signal line FSLSD, and USBIO circuit 150A includes a high-voltage (first) driver circuit 151 configured to re-transmit these USB data signals at the required 3.3V level on standard USB data signal lines USBDP and USBDM.

System 110A differs from the generalized embodiment by way of utilizing USBIO circuit 120A to implement all USB data reception operations, and by way of configuring USBIO circuit 120A to perform High Speed data transmission operations. In a presently preferred embodiment, these functions are implemented by USBIO circuit 120A in order to minimize changes to existing USB PHY configurations (i.e., by way of minimizing the differences between USBIO circuit 120A and a conventional USB PHY configuration), which both reduces overall system size and cost by way of implementing as many functions on a host SoC device as possible, and also to avoid production delays by way of avoiding unnecessary changes to corresponding circuit structures adopted from the conventional USB PHY.

The first difference mentioned above (i.e., using USBIO circuit 120A to implement all USB data reception operations) involves the use of a receiver circuit 122A as part of USBIO circuit 120A, and also requires the use of an attenuation circuit 160A. Attenuation circuit 160A is coupled between associated data lines of USB bus 175 and a low-voltage bus 155A, and is configured to attenuate incoming data signals transmitted on USB bus 175 during USB data reception operations such that all incoming High Speed, Full Speed and Low Speed USB data signals transmitted from USB receptacle 170 on USB data signal lines USBDP and USBDM are passed onto corresponding low-voltage data signal lines DP and DM, respectively, at low voltage levels (e.g., 1.8V or less) that can be processed by receiver circuit 122A without damage. Data reception operations utilizing attenuation circuit 160A and receiver circuit 122A are described in additional detail below with reference to FIGS. 3A and 3B. The addition of attenuation circuit 160A in this manner facilitates implementing receiver circuit 122A using substantially the same circuit arrangement as that utilized in the receiver circuit of a conventional USB PHY (i.e., minimal changes to the previously established receiver circuit configuration would be needed), while also benefiting from the size and power saving benefits of the cutting-edge technology node used to fabricate the host SoC circuit.

The second difference mentioned above (i.e., utilizing circuitry of USBIO circuit 120A to perform High Speed data transmission operations) involves the use of a High Speed (HS) driver circuit 124A, and a corresponding modification to FS/LS output control circuit 125A to facilitate the 3.3V data transmissions performed using FS/LS driver circuit 151A. In the preferred embodiment, HS driver circuit 124A receives outgoing High Speed USB data and associated control signals from USB control circuit 130, and generates outgoing High Speed USB data transmissions at the required 0.4V levels that are passed on low-voltage data lines DP and DM by way of attenuation circuit 160A to standard USB data signal lines USBDP and USBDM, respectively. As explained in additional detail below with reference to FIGS. 3C and 3D, FS/LS output control circuit 125A is modified to disable FS/LS driver circuit 151A during High Speed USB data transmission operations by way of a corresponding control signal transmitted on output enable signal line FSL-SOE, which is included in low-voltage bus 155A. In the preferred embodiment, HS driver circuit 124A is implemented by way of disabling/removing control transistors utilized by the driver circuit of a conventional USB PHY (i.e., such that circuitry and associated control signals utilized in the conventional USB PHY to execute High Speed data transmissions are retained), thereby further minimizing changes to the previously established USB PHY configuration. Note that the implementation of High Speed USB data transmissions using USBIO 120A assumes that the cutting-edge technology node used to fabricate the host SoC device is capable of handling the voltage levels required for High Speed USB data transmissions, and in some cases it may be necessary to implement High Speed USB data transmissions using circuitry provided on USBIO 150A. In other embodiments, the High Speed USB data transmission operation may be implemented using circuitry provided on USBIO 150A for other reasons.

FIGS. 3A to 3D are simplified block diagrams depicting exemplary USB communication operations using the two-part USB PHY configuration of FIG. 2.

Figure 3A:
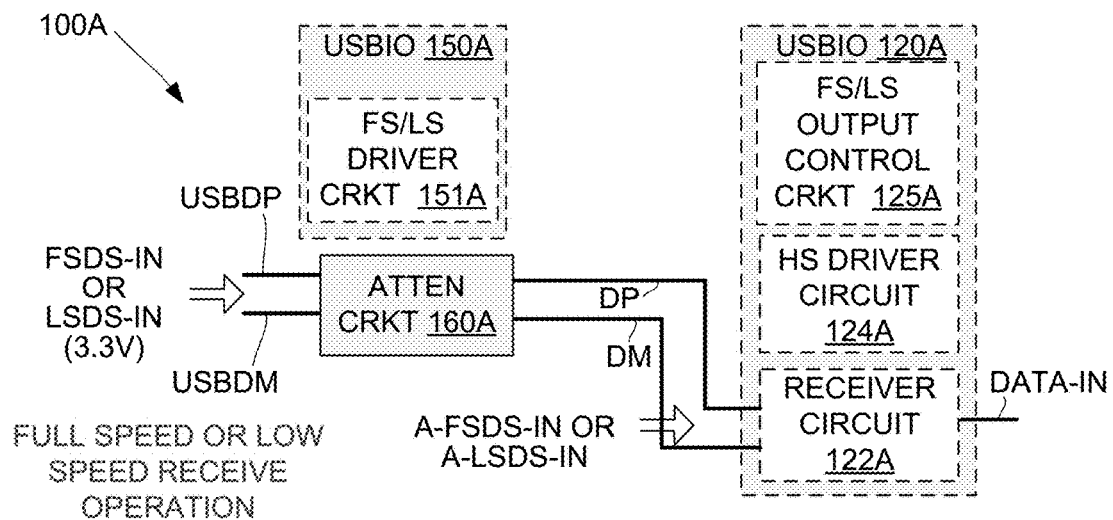
FIGS. 3A, 3B, 3C and 3D are block diagrams illustrating operations performed by the two-part USB PHY configuration of FIG. 2.
Figure 3B:
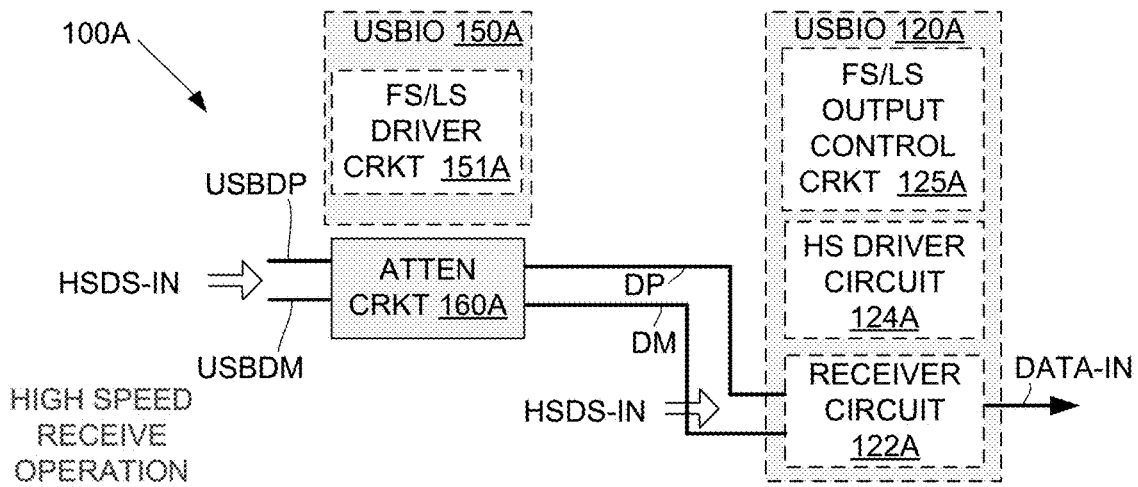

FIGS. 3A and 3B depict USB data reception operations during which USB data signals are received and processed using receiver circuit 122A. FIG. 3A depicts an exemplary Full Speed or Low Speed data reception operation during which 3.3V data signals (i.e., either Full Speed data signals (FSDS-IN) or Low Speed data signals (LSDS-IN)) are transmitted onto USB signal lines USBDP and USBDM from an external source by way of the USB receptacle (not shown). As mentioned above, attenuation circuit 160A is configured to attenuate the received 3.3V data signals, and to pass attenuated versions (i.e., A-FSDS-IN and A-FSDS-IN) on corresponding low-voltage data signal lines DP and DM to receiver circuit 122A of USBIO circuit 120, whereby receiver circuit 122A is only required to process attenuated versions A-FSDS-IN and A-FSDS-IN, for example, having maximum voltage levels of 1.8V or less. FIG. 3B depicts an exemplary High Speed data reception operation during which incoming 0.4V High Speed data signals HSDS-IN are transmitted by way of USB signal lines USBDP and USBDM to receiver circuit 122A. In this case, attenuation circuit 160A functions merely as a filter to prevent voltage spikes from reaching receiver circuit 122A. Note that circuitry utilized by conventional USB PHYs to identify an incoming USB signal type (i.e., High Speed, Fast Speed or Low Speed) does not rely on the incoming signals voltage level, and as such the attenuation of the incoming data signals using attenuator circuit 160A does not require a corresponding change to existing USB 2.0 PHY circuitry.

Figure 3C:
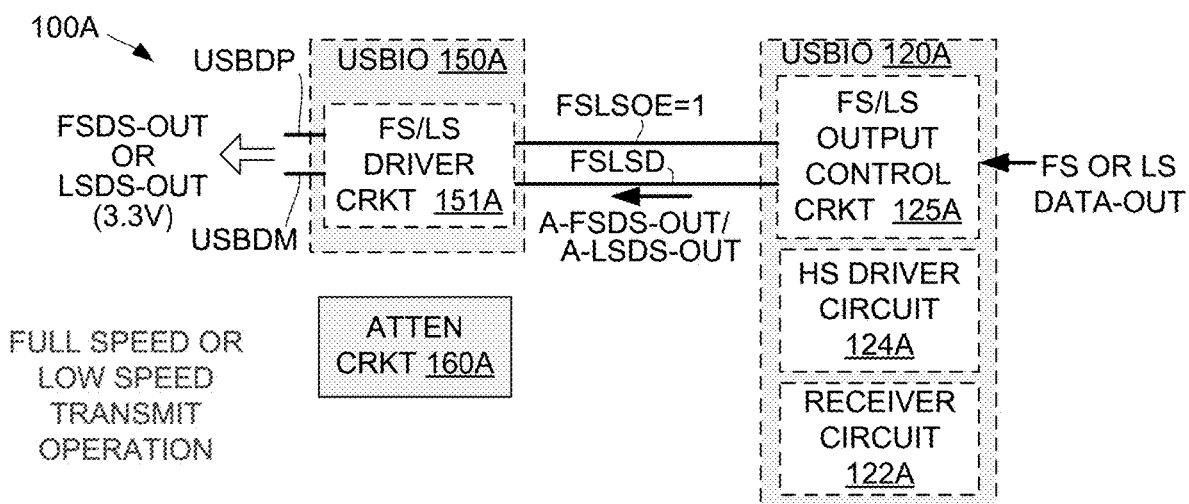
Figure 3D:
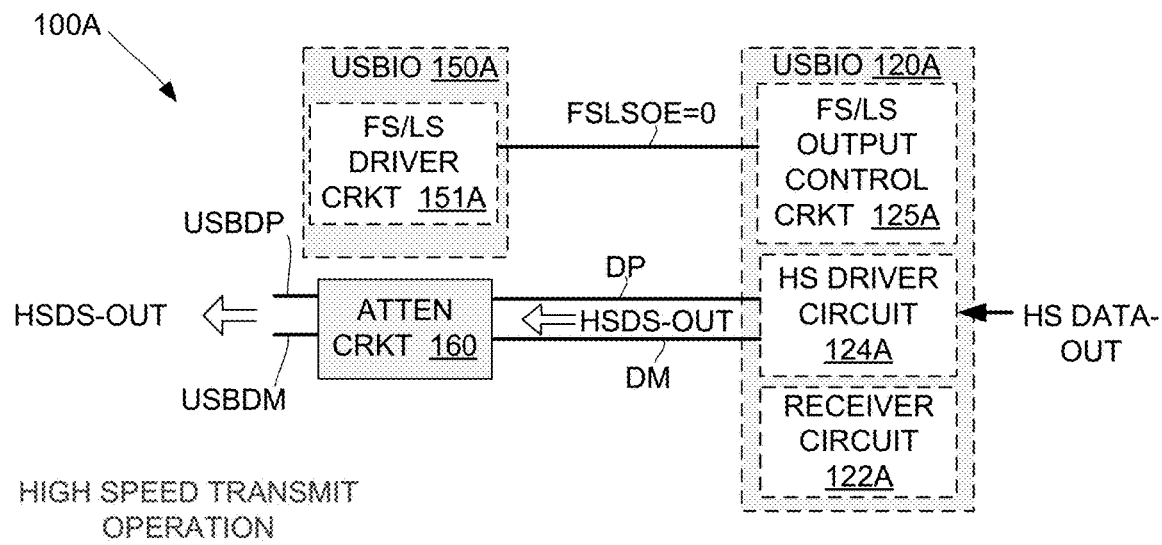

FIGS. 3C and 3D depict USB data transmission operations during which outgoing USB data signals are transmitted to an external device or system by way of USB data signal lines USBDP and USBDM. FIG. 3C depicts an exemplary Full Speed or Low Speed data transmission operation during which Full Speed or Low Speed data signals DATA-OUT are transmitted by way of USB control circuit 130 to FS/LS output control circuit 125A, along with corresponding control signals indicating the transmission signal type. As mentioned above, FS/LS output control circuit 125A is configured to receive the FS DATA-OUT and DS DATA-OUT signals, and configured to transmit corresponding attenuated (low-voltage) Full Speed USB data signals A-FSDS-OUT or attenuated Low Speed USB data signals A-LSDS-OUT at low voltage levels (e.g., 1.8V or less) to USBIO circuit 150A by way of transfer signal line FSLSD. FS/LS output control circuit 125A is also configured to generate an appropriate control signal (e.g., "FSL-SOE=1") on output enable signal line FSLSOE. In response to the appropriate control signal, FS/LS driver circuit 151 retransmits the attenuated data signals transmitted on transfer signal line FSLSD as Full Speed USB data signals FSDS-OUT or Low Speed USB data signals LSDS-OUT to said standard USB receptacle 170 by way of standard USB data signal lines USBDP and USBDM at 3.3V levels. FIG. 3D depicts an exemplary High Speed data transmission operation during which High Speed data HS DATA-OUT is transmitted by way of USB control circuit 130 to HS driver circuit 124A, along with corresponding control signals indicating the High Speed transmission signal type. As mentioned above, HS driver circuit 124A is configured to generate High Speed USB data signals HSDS-OUT on low-voltage data signal lines DP and DM in response to associated High Speed data signals HS DATA-OUT. In one embodiment, FS/LS output control circuit 125A is also configured to generate an appropriate control signal (e.g., "FSLSOE=0") on output enable signal line FSLSOE during High Speed data transmissions.

Figure 4:
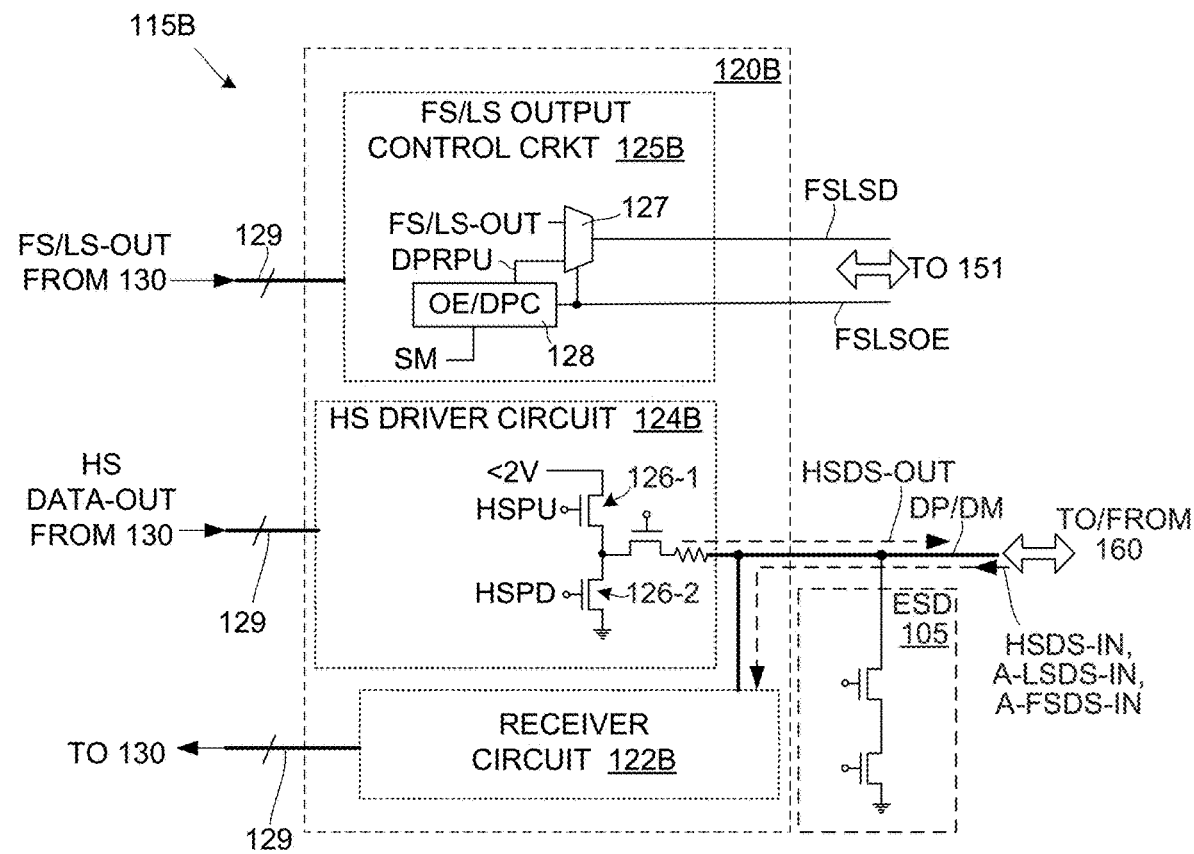
FIG. 4 is a simplified block/circuit diagram showing a low-voltage USB PHY portion (I/O subsystem) of the two-part USB PHY configuration of FIG. 2 according to a specific embodiment of the present invention.

FIG. 4 is a simplified block/circuit diagram depicting a portion of a USB PHY portion 115B according to another embodiment of the present invention.

Referring to the bottom of FIG. 4, both receiver circuit 122B and HS driver circuit 124B are coupled to low-voltage signal lines DP and DM (one shown), whereby incoming attenuated USB data signals A-FSDS-IN, A-LSDS-IN and HSDS-IN are passed by way of receiver circuit 122B and bus 129 to USB control circuit 130, and outgoing High Speed data signals received from USB control circuit 130 by way of bus 129 are transmitted by HS driver circuit 124B as outgoing data signals HSDS-OUT in the manner described above. As mentioned above, HS driver circuit 124B is implemented by way of disabling/removing control transistors utilized by the driver circuit of a conventional USB PHY that are associated with Full Speed and Low Speed data transmissions, whereby HS driver circuit 124B utilizes a pull-up transistor 126-1 and a pull-down transistor 126-2 that are operably coupled between a suitable voltage source (e.g., less than 2V) and ground, and operably configured to generate the HSDS-OUT signals on low-voltage data signal lines DP/DM by way of converting the HS DATA-OUT signals into differential signals HSPU and HSPD before being applied to transistors 126-1 and 126-2 in order to further minimize changes to previously established USB PHY configuration.

Referring to the upper portion of FIG. 4, in the exemplary embodiment FS/LS output control circuit 125B utilizes a multiplexer 127 and an output enable/DP pullup control circuit (OE/DPC) 128 to generate an appropriate control signal on control line FSLSOE during data transmission operations. OE/DPC 128 is controlled by a speed mode (SM) signal received from USB control circuitry, which indicates whether a given data transmission is to be performed at Full Speed or Low Speed, and generates both an associated FS/LS output enable control signal and a DP pullup signal DPRPU. The FS/LS output enable control signal is utilized to control multiplexer 127, and is also transmitted on signal line FSLSOE. Multiplexer 127 is controlled by the FS/LS output enable control signal to either transmit the received FS-OUT/LS-OUT data signal onto low-voltage data signal line FSLSD, or to transmit a DP pullup signal DPRPU onto low-voltage data signal line FSLSD.

Figures 5, 6:
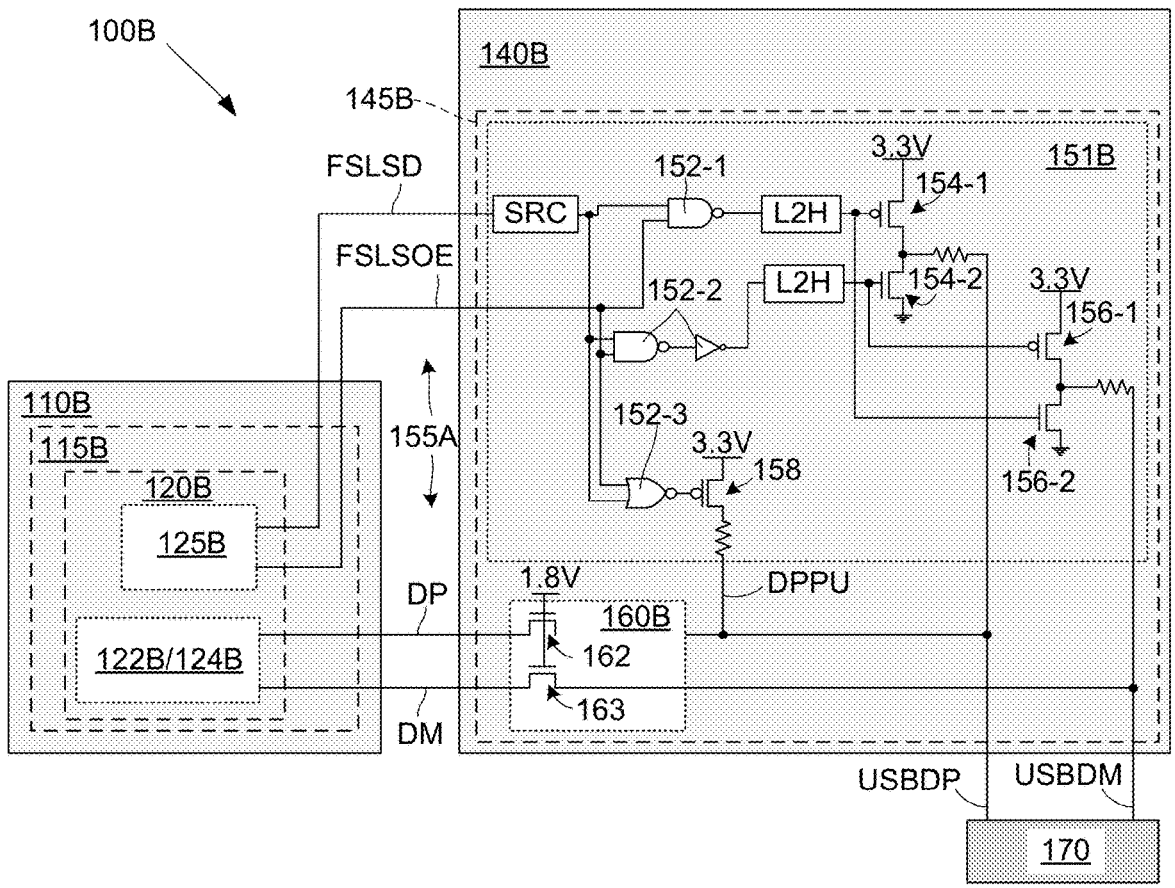
FIG. 5 is a simplified block/circuit diagram showing a system including the low-voltage USB PHY portion of FIG. 4 and a corresponding high-voltage USB PHY portion (I/O subsystem) according to another specific embodiment of the present invention.
FIG. 6 is a truth table showing exemplary signal values utilized by the system of FIG. 5 during USB data transmission operations.

FIG. 5 is a block/circuit diagram showing a simplified system 100B that includes SoC device 110B, which is described above with reference to FIG. 4, and also includes a PMD 140C that is coupled to SoC device 110B by way of low-voltage bus 155A in a manner consistent with the description above. PMD 140C includes a USBPP 145C having the details depicted in FIG. 5 and described below.

Referring to the upper portion of FIG. 5, signals generated by FS/LS output control circuit 125B of USBIO circuit 120B in the manner described above are passed on low-voltage data signal line FSLSD and control signal line FLSLOE to FS/LS driver circuit 151B of USBIO circuit 150B. The signals transmitted on data signal line FSLSD are passed through a synchronous rectifier control (SCR) circuit and then applied to corresponding first input terminals of NAND logic gate 152-1, NAND logic gate 152-2 and NOR logic gate 152-3, and signals transmitted on control signal line FLSLOE are applied directly to corresponding second input terminals of NAND logic gate 152-1, NAND logic gate 152-2 and NOR logic gate 152-3. The output terminals of NAND logic gate 152-1 and NAND logic gate 152-2 are respectively coupled to corresponding gate terminals of pull-up/pull-down transistor pairs by way of L2H elements, with output signals transmitted from NAND logic gate 152-1 being applied to the gate terminals of pull-up transistor 154-1 and pull-down transistor 156-2, and output signals transmitted from NAND logic gate 152-2 being passed through an inverter before being applied to the gate terminals of pull-down transistor 154-2 and pull-up transistor 156-1. Pull-up transistor 154-1 and pull-down transistor 154-2 are connected in series between a 3.3V voltage source and ground, with a node therebetween connected to USB signal line USBDP, and pull-up transistor 156-1 and pull-down transistor 156-2 are also connected in series between the 3.3V voltage source and ground, with a node therebetween connected to USB signal line USBDN. With this configuration, FS/LS driver circuit 151B facilitates the conversion of Full Speed data signals transmitted on low-voltage data signal line FSLSD during Full Speed USB data transmission operations into corresponding Full Speed USB data signals transmitted on standard USB data signal lines USBDP and USBDM, and the conversion of Low Speed data signals transmitted on low-voltage data signal line FSLSD during Low Speed USB data transmission operations into corresponding Low Speed USB data signals on standard USB data signal lines USBDP and USBDM. Note that the Full Speed/Low Speed transmission operation of system 100B is implemented using a simple two-pin interface by way of utilizing multiplexer 127 (FIG. 4) to transmit the DP pullup signal using the FSLSOE signal line. FIG. 6 is a truth table including exemplary signal values generated during operation of system 100B. Note also that Full-Speed/Low-Speed output enable signal is asserted (i.e., "FLSLOE=1") only during Full-Speed and Low-Speed data transmissions, and is de-asserted (i.e., "FLSLOE=0") at all other times, whereby logic gate 152-3 turns on PMOS transistor 158 to couple USB signal line USBDP to the 3.3V source by way of a suitable resistor (e.g., 1.5 kΩ), thereby applying a suitable pull-up voltage on signal line USBDP.

Referring the lower portion of FIG. 5, in one embodiment attenuation circuit 160B implements the required attenuation of incoming Full-Speed and Low-Speed data signals using a pair of pass gates 162 and 163. Pass gate 162 is connected between signal line USBDP and low-voltage signal line DP of low-voltage bus 155A, and is controlled by a fixed 1.8V source such that data signals having voltage levels greater than 1.8V on signal line USBDP are passed to low-voltage signal line DP at an attenuated (low) 1.8V level. Similarly, Pass gate 163 is connected between signal line USBDM and low-voltage signal line DM, and is controlled by the 1.8V source such that data signals are passed from signal line USBDM to low-voltage signal line DM with maximum voltage levels of 1.8V.

Figure 7:
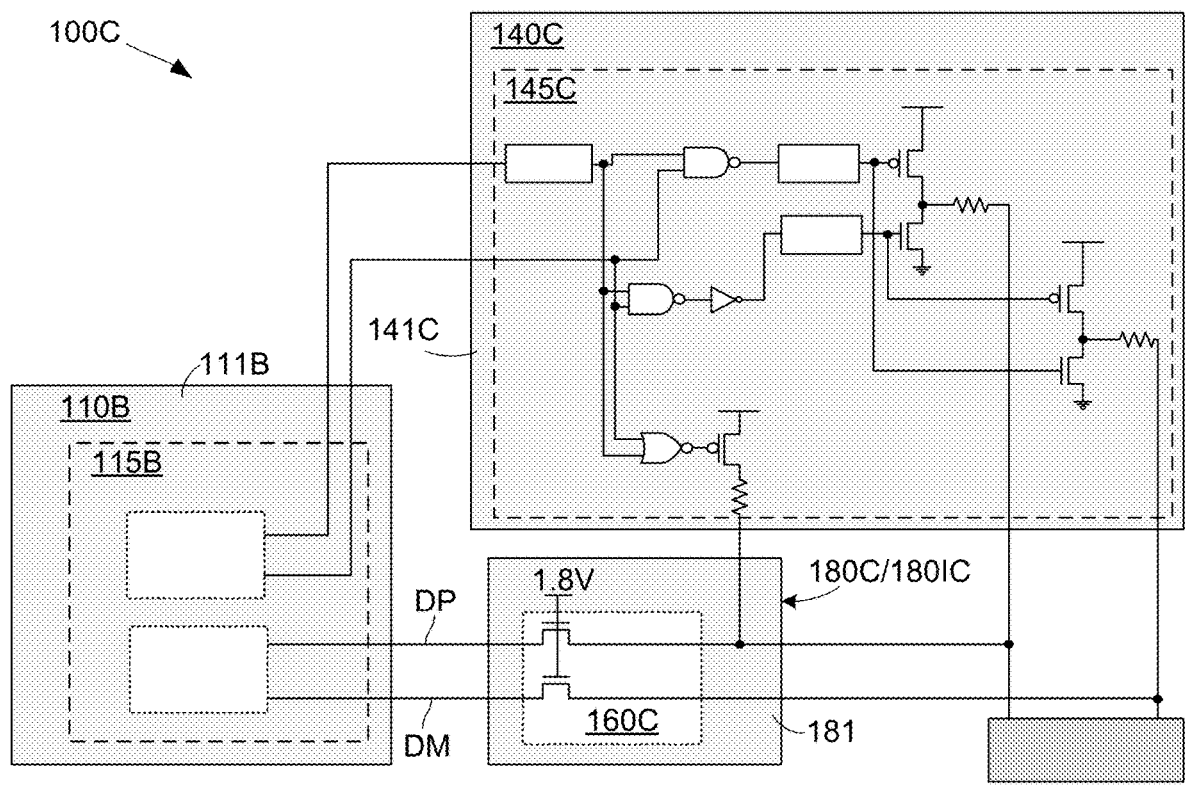
FIG. 7 is a simplified block/circuit diagram showing a system including the two-part USB PHY configuration of FIG. 2 according to another specific embodiment of the present invention.
Figure 8:
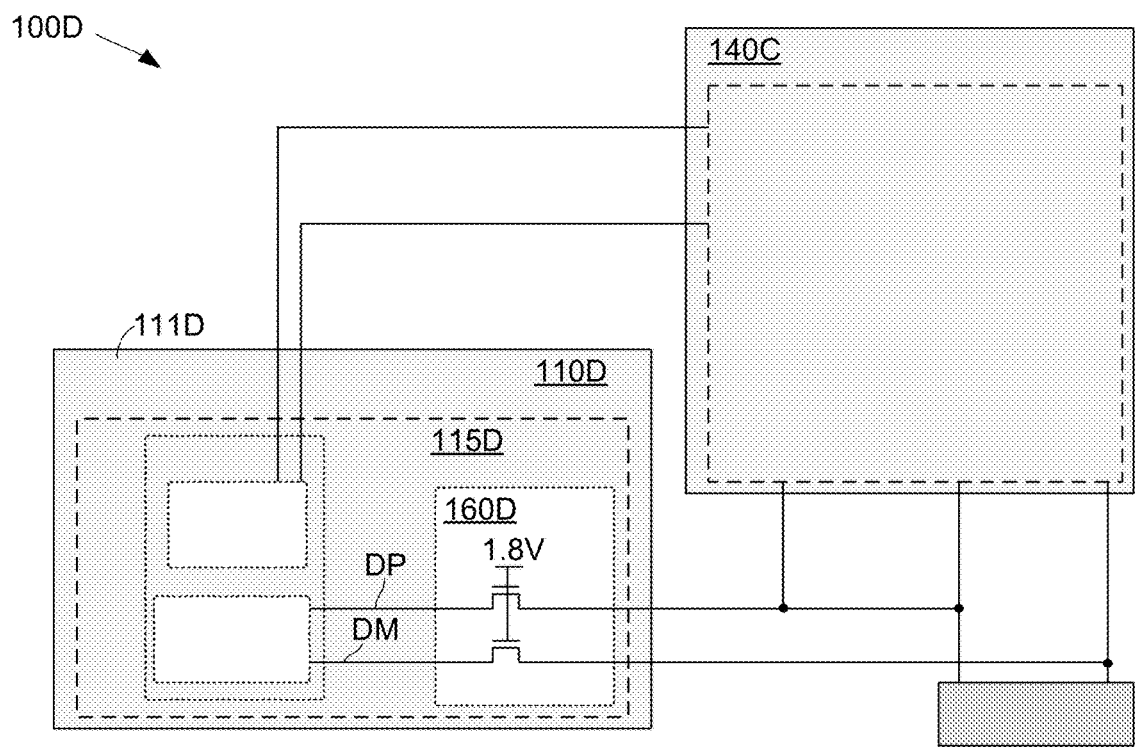
FIG. 8 is a simplified block/circuit diagram showing a system including the two-part USB PHY configuration of FIG. 2 according to another specific embodiment of the present invention.

According to alternative practical embodiments of the present invention, the above-mentioned attenuation circuit may be implemented on the PMD, on the SoC device, or as a stand-alone component. Referring again to FIG. 5, according to a presently preferred embodiment attenuation circuit 160B is implemented as part of USBPP 145B (i.e., is included in the cell describing USBPP 145B such that attenuation circuit 160B is fabricated as part of PMD 140B). This approach minimizes the number of components required to generate system 100B while maximizing safety (i.e., by way of preventing high voltage signals from reaching SoC device 110B). FIG. 7 shows a system 100C including SoC 110B described above, and including an associated PMD 140C configured according to an alternative embodiment in which an attenuation circuit 160C is implemented as part of a separate integrated circuit component 180IC that is fabricated on a discrete chip 181 (i.e., separate from chip 111B of SoC device 110B and chip 141C of PMD 140C). This approach eliminates the need for configuring PMD 140C with I/O pins (terminals) for supporting low-voltage bus data lines DP and DM, which are required in the embodiment of FIG. 5, while achieving the same level of safety (i.e., by way of preventing high voltage signals from reaching SoC device 110B), but requires the provision of an associated (third) cell 180C for inclusion in the associated EDA software tool cell library (i.e., in additional to the two cells utilized to describe USBPP 115B and USBPP 145C, respectively), and also requires an additional fabrication process to generate integrated circuit component 180IC using the third cell. FIG. 8 shows a system 100D according to another alternative embodiment that utilizes PMB 140C (described above), and an SoC 110D that is fabricated on a chip 111D using a technology node that supports the integration of an attenuation circuit 160D into a low-voltage USBPP 115D. Note that this embodiment facilitates the fabrication of low-voltage signal lines DM and DP entirely on SoC device 110D, thus eliminating the associated I/O pins, and also avoids the need for an additional component and third cell, as required by the embodiment of FIG. 7.

Technology Specific EDA System/Workflow Explanation

Figure 9:
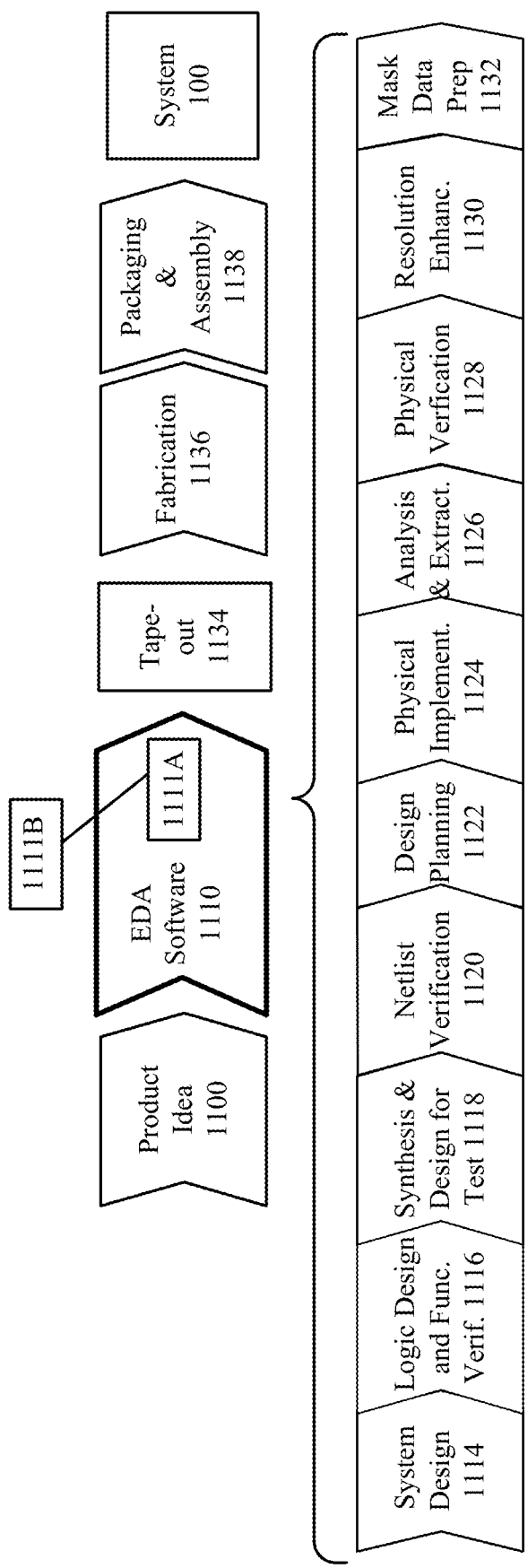
FIG. 9 is a flowchart illustrating various operations in the design and fabrication of an integrated circuit in accordance with an embodiment of the present disclosure.

FIG. 9 illustrates various processes performed in the design and fabrication of a system 100 including the SoC devices and associated power management devices described above using software tools with a computer to transform data and instructions that represent the associated integrated circuits. These processes start with the generation of a product idea (1100) with information supplied by an SoC designer and is realized as an evolving system design during a design process performed using EDA software tools (1110) by an SoC designer (user). In one embodiment, one or more steps of the EDA software design process performed by EDA software tools (1110) is implemented using a computer-readable medium 1111A that is read by a computer 1111B. EDA software tools may also be signified herein using the singular "EDA software tool", as EDA software, or as a design tool. In the context of the present invention, system designs generated using EDA software tools (1110) are characterized by including at least one SoC device including a low-voltage USB PHY portion, and at least one power management device including a high-voltage USB PHY portion, where the low-voltage USB PHY portion and high-voltage USB PHY portion are configured in accordance with any of the embodiments described above. When a system design is finalized, it is typically taped-out (1134), and then at least one semiconductor die is fabricated (1136) using at least two technology nodes. The at least one semiconductor die is/are then diced, and then the corresponding chip or chips are packaged and assembled using corresponding processes (1138), resulting in finished system 100. As set forth above, system 100 includes one or more chips on which are formed the SoC device, power management device, and optional discrete components mentioned herein.

Note that the design process that uses EDA software tools (1112) includes operations 1114-1132, which are described below. This design flow description is for illustration purposes only and is not meant to limit the present disclosure. For example, an actual integrated circuit design may require a designer (e.g., a SoC designer) to perform the design operations in a different sequence than the sequence described herein.

During system design (1114), a designer describes the functionality to be manufactured. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products. Cells or other descriptions including all relevant information pertaining to the two-part PHY configuration of the present invention are typically copied from a library accessible by way of the EDA software tool, and inserted into an SoC design during the system design process.

Then, during logic design and functional verification (1116), VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

Next, during synthesis and design for test (1118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

Moreover, during netlist verification (1120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products.

Furthermore, during design planning (1122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

Additionally, during physical implementation (1124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: the Astro and IC Compiler products.

Then, during analysis and extraction (1126), the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products.

Next, during physical verification (1128), the design is checked to ensure correctness for manufacturing issues, electrical issues, lithographic issues, and circuitry. Exemplary EDA software products from Synopsys, Inc. of Mountain View, Calif. that can be used at this stage include the Hercules product.

Moreover, during resolution enhancement (1130), geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation (1132), the 'tape-out' data for production of masks to produce finished integrated circuits is provided. Exemplary EDA software products from Synopsys, Inc. of Mountain View, Calif. that can be used at this stage include the Cats. family of products.

For all of the above mentioned integrated circuit design tools, similar tools from other EDA vendors, such as Cadence and Mentor Graphics can be used as an alternative. Additionally, similarly non-commercial tools available from universities can be used.

Embodiments of the present disclosure can be used during one or more of the above-described stages. Specifically, some embodiments of the present disclosure can be used in EDA software 1112.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Hardware/Software Equivalence

Certain innovations, embodiments and/or examples described herein comprise and/or use a processor. As used herein, the term "processor" signifies a tangible information processing device that physically transforms information, for example, data. As defined herein, "data" signifies information that can be in the form of an electrical, magnetic, or optical signal that is capable of being stored, accessed, transferred, combined, compared, or otherwise manipulated by an information processing device.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For information structured in binary form, any processor that can transform the information using the AND, OR and NOT logical operations (and their derivatives, such as the NAND, NOR, and XOR operations) can transform the information using any function of Boolean logic. A processor such as a neural network processor can also transform information non-digitally. There is no scientific evidence that any of these processors are processing, storing and retrieving information, in any manner or form equivalent to the bioelectric circuitry of the human brain.

As used herein, the term "module" signifies a tangible information processing device that typically is limited in size and/or complexity. For example, one or more methods or procedures in a computer program can be referred to as a module. A module can also refer to a small network of digital logic devices, in which the logic devices often may be interconnected to form a network. In many cases, methods and procedures in a computer program written in a specialized language, such as System C, can be used to generate a network of digital logic devices that process information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Altera), Random Access Memories (RAMS) or microprocessors. A module is configured to process information, typically using a sequence of operations to transform the information (or in the case of ROMs and RAMS, transforming information by using the input information as an address for memory that stores output information), to perform aspects of the present innovations, embodiments and/or examples of the invention.

Modules that are temporarily configured need not be configured at any one instance in time. For example, an information processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a sequence or set of operations or instructions that a module can use to transform information to achieve a result. A module can comprise one or more algorithms. As used herein, the term "computer" includes an information processor that can perform certain operations such as (but not limited to) the AND, OR and NOT logical operations, with the addition of memory (for example, memory based on flip-flops using the NOT-AND or NOT-OR operation). Such a digital computer is said to be Turing-complete or computationally universal. A computer, whether or not it is a digital computer, typically comprises many modules.

As used herein, the term "software" or "program" signifies one or more algorithms and data structures that configure an information processing device for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of instruction and data that configure the information processing device to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from an information storage device. The computer typically has a device for reading storage media that is used to transport the software, or has an interface device that receives the software over a network.

Technology Specific General Computer Explanation

FIGS. 10A, 10B and 10C are simplified block diagrams of a computer system suitable for creating systems including embodiments of the two-part interface PHY configuration of the present invention, as well as circuit design and circuit embodiments incorporating the two-part PHY configuration of the present invention. Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions 124 (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi-processor or multi-core systems and may use or be implemented in distributed or remote systems. Processor here is used in the broadest sense to include singular processors and multi-core or multi-processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 10A is intended only as a specific example for purposes of illustrating the preferred embodiments. Many other configurations of computer system 3110 are possible having more or less components than the computer system depicted in FIG. 10A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118. User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide nonvisual display such as via audio output devices. In general, use of the term "output device" is intended to include all possible types of devices and ways to output information from computer system 3110 to the user or to another machine or computer system.

Memory subsystem 3126 typically includes a number of memories including a main random access memory (RAM) 3130 for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128. Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

When configured to execute an EDA software tool including a cell library containing two or more cells configured in accordance with any of the two-part PHY configurations described herein, computer system 3110 depicted in FIG. 10A represents an electronic structure suitable for creating a system design including any of the SoC device and associated power management devices described above. Specifically, the cell library contains at least two cells: a first cell including all information required to implement any of the low-voltage USB PHY portions described above, and a second cell including all information required to implement a corresponding low-voltage USB PHY portion (also described above). In addition, the EDA software tool is configured to facilitate instantiation of the first cell into a user's SoC device design, and to facilitate instantiation of the second cell into a power management device configured to supply one or more supply voltage signals to the user's SoC device during system operations (i.e., after the design and fabrication process described above with reference to FIG. 9 is completed).

FIG. 10B shows a memory 3140 such as a non-transitory, computer readable data storage medium associated with file storage subsystem 3128, and/or with network interface subsystem 3116, and includes a data structure 3180 specifying a circuit design describing an integrated circuit (e.g., a SoC device or a PMD) that includes an instantiated cell 3181. According to an embodiment of the present invention, cell 3181 is placed or otherwise operably copied into data structure 3180 from the above-mentioned cell library contained in file storage subsystem 3128 using an EDA software tool, and cell 3181 includes computer readable parameters specifying structural features consistent either with any of the low-voltage USB PHY portions described herein, or any of the high-voltage USB PHY portions described herein. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 10C is a block representing an integrated circuit 3190 (e.g., an SoC device or a PMD) designed and fabricated in accordance with the processes described above, where circuit 3190 is fabricated in accordance with the circuit design of data structure 3180 (see FIG. 10B), whereby circuit 3190 implements the USB PHY portion described by cell 3181.

Although the present invention is described with particular reference to methods and circuits utilized to produce low-voltage SoC devices that are USB 2.0 compliant, the spirit and scope of the present invention may also be utilized to make low-voltage SoC devices that are compliant to newer USB standards (e.g., USB 3.0, USB 3.1, and USB 3.2), and also compliant to other interface standards (e.g., Converged IO (CIO), HDMI, Thunderbolt3 or $I^2C$) that require 3.3V (or other higher voltage) circuit elements.

The foregoing Detailed Description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. An electronic design automation (EDA) software tool in a computer system that, when executed by a processor of the computer system, causes the processor to generate a system design including a System-on-Chip (SoC) device and an associated power management device such that said SoC device includes a processor and additional circuitry configured to perform a useful function during system operation, and such that said power management device is configured to operably provide one or more supply voltage signals to the SoC device during said system operation, the EDA software tool including machine readable specifications comprising:

a first cell including a first PHY portion that is configured for instantiation in said SoC device, said first PHY portion including a first input/output circuit and a control circuit, said control circuit being operably coupled between said processor and said first input/ output circuit, said first input/output circuit including an output control circuit configured to transmit onto a transfer signal line attenuated data signals received from said control circuit during associated data transmission operations, wherein said attenuated data signals are transferred onto said transfer signal line with first maximum voltage levels;

a second cell including a second PHY portion that is configured for instantiation in said power management device, said second PHY portion including a second input/output circuit configured such that, when said power management device is operably coupled to a standard bus and said power management device is operably coupled to said first input/output circuit by way of said said transfer signal line, said second input/output circuit re-transmits said attenuated data signals received on said transfer signal line from said first input/output circuit such that said re-transmitted attenuated data signals are transmitted onto said standard bus with second maximum voltage levels that are higher than said first maximum voltage levels; and an attenuation circuit having first terminals connected to said standard bus and second terminals connected to low-voltage data signal lines, said attenuation circuit being configured to attenuate received data signals transmitted on said standard bus during data reception operations such that all of said attenuated received data signals are passed on said low-voltage data signal lines with maximum voltage levels of less than 2V, wherein said first input/output circuit is further configured to receive said attenuated received data signals transmitted on the low-voltage data signal lines.

2. The EDA software tool of claim 1, wherein said first PHY portion of said first cell comprises a first USB PHY portion (USBPP), said first input/output circuit comprises a first USB input/output (USBIO) circuit, said control circuit comprises a USB control circuit, and said output control circuit comprises a full-speed/low-speed (FS/LS) output control circuit configured to transmit onto said transfer signal line attenuated Full Speed USB data signals received from said USB control circuit during Full Speed USB data transmission operations, and configured to transmit onto said transfer signal line attenuated Low Speed USB data signals received from said USB control circuit during Low Speed USB data transmission operations, and wherein said second PHY portion of said second cell comprises a second USB PHY portion (USBPP), and said second input/output circuit comprises a second USB input/output (USBIO) circuit configured such that, when said power management device is operably coupled to a USB receptacle by way of a standard USB bus and said power management device is operably coupled to said first USBIO circuit by way of said transfer signal line, a first driver circuit of said second USB input/output (USBIO) circuit re-transmits said Full Speed USB data signals and said Low Speed USB data signals received from said first USB I/O circuit such that said re-transmitted Full Speed USB data signals and Low Speed USB data signals are transmitted onto standard USB data signal lines of said standard USB bus.

3. The EDA software tool of claim 2, wherein said first terminals of said attenuation circuit are connected to said standard USB data signal lines and said second terminals of said attenuation circuit are connected to said low-voltage data signal lines, and wherein said attenuation circuit is configured to attenuate received data signals transmitted on said standard USB data signal lines of said standard USB bus during USB data reception operations such that all of said attenuated received data signals are passed on said low-voltage data signal lines to said first USBIO circuit with said maximum voltage levels of less than 2V, and wherein said first USBIO circuit of said first USBPP further comprises a receiver circuit configured to receive said attenuated received data signals from said low-voltage data signal lines during said USB data reception operations, and to operably re-transmit corresponding received data signals to said USB control circuit.

4. The EDA software tool of claim 3, wherein said first USBIO circuit of said first USBPP further comprises a second driver circuit configured to generate High Speed USB data signals on said low-voltage data signal lines in response to associated High Speed data signals received from the USB control circuit during High Speed USB data transmission operations.

5. The EDA software tool of claim 4, wherein said second driver circuit of said first USBPP comprises a pull-up transistor and a pull-down transistor operably coupled between a 0.4V voltage source and ground, and being operably configured to generate said High Speed USB data signals on said low-voltage data signal lines in response to said associated High Speed data signals received from the USB control circuit during said High Speed USB data transmission operations.

6. The EDA software tool of claim 2, wherein the first driver circuit of said second USBPP comprises a pair of pull-up transistors and a pair of pull-down transistors operably coupled between a 3.3V voltage source and ground, and operably configured to generate one of said Full Speed USB data signals and said Low Speed USB data signals on said standard USB bus during an associated one of said Full Speed USB data transmission operations and said Low Speed USB data transmission operations.

7. The EDA software tool of claim 6, wherein said FS/LS output control circuit of said first USBPP comprises first logic configured to assert a Full-Speed/Low-Speed output enable signal during said Full Speed USB data transmission operations and said Low Speed USB data transmission operations, and to de-assert said Full-Speed/Low-Speed output enable signal during said High Speed USB data transmission operations and data reception operations, and wherein said first driver circuit of said second USBPP comprises second logic configured to pass said associated one of said Full Speed data signals and said Low Speed data signals received from the USB control circuit to said pull-up transistor and said pull-down transistor only when said Full-Speed/Low-Speed output enable signal is asserted.

8. The EDA software tool of claim 3, wherein said attenuation circuit comprises:

a first pass gate having a first terminal connected to a USBDP signal line of said standard USB bus and a second terminal connected to a first signal line of said low-voltage data signal lines; and a second pass gate having a first terminal connected to a USBDM signal line of said standard USB bus and a second terminal connected to a second signal line of said low-voltage data signal lines, wherein gate terminals of said first and second pass gates are coupled to a low voltage source generated by said power management device.

9. The EDA software tool of claim 8, wherein said attenuation circuit is operably included in said second cell such that said attenuation circuit is fabricated as part of said power management device, whereby the transfer signal line and the low-voltage data signal lines extend between the first cell and the second cell.

10. The EDA software tool of claim 8, wherein said attenuation circuit is implemented in a third cell that is separate from said first and second cells such that said attenuation circuit is fabricated on a discrete integrated circuit chip that is separate from said power management device and said SoC device, whereby the transfer signal line extends between the first cell and the second cell and the low-voltage data signal lines extend between the third cell and the second cell.

11. The EDA software tool of claim 8, wherein said attenuation circuit is operably included in said first cell such that said attenuation circuit is fabricated as part of said SoC device, whereby the transfer signal line extends between the first cell and the second cell and the low-voltage data signal lines are disposed on the second cell.

12. A system comprising:
a system-on-chip (SOC) device including a processor, a first PHY portion including a first input/output circuit and a control circuit, said control circuit being operably coupled between said processor and said first input/output circuit; and
a power management device having a second PHY portion including a second USBIO circuit that is operably coupled to a receptacle by way of a bus, and operably coupled to said first input/output circuit by way of a low-voltage bus, said low-voltage bus including one or more transfer signal lines and one or more low-voltage data signal lines that respectively extend in parallel between the power management device and the SoC device,
wherein said first input/output circuit is configured to receive outgoing data signals from said USB control circuit during associated data transmission operations, and configured to transmit said data signals with first maximum voltage levels onto said one or more transfer signal lines of said low-voltage bus,
wherein said second input/output circuit includes a first driver circuit that is configured to receive said transmitted data signals from said one or more transfer signal lines, and to re-transmit said data signals to said receptacle by way of said bus such that said data signals are re-transmitted with maximum voltage levels that are higher than said first maximum voltage levels, and
wherein said second PHY portion includes an attenuation circuit having first terminals connected to said bus and second terminals connected to low-voltage data signal lines of said low-voltage bus, said attenuation circuit being configured to attenuate received data signals transmitted on said bus during data reception operations such that all of said attenuated received data signals are passed on said low-voltage data signal lines of said low-voltage bus to said first input/output circuit with maximum voltage levels of less than 2V.

13. The system of claim 12,
wherein said first PHY portion comprises a first USB PHY portion (USBPP), said first input/output circuit comprises a first USB input/output (USBIO) circuit, said control circuit comprises a USB control circuit, and said output control circuit comprises a full-speed/low-speed (FS/LS) output control circuit configured to transmit onto said transfer signal line attenuated Full Speed USB data signals received from said USB control circuit during Full Speed USB data transmission operations, and configured to transmit onto said transfer signal line attenuated Low Speed USB data signals received from said USB control circuit during Low Speed USB data transmission operations, and
wherein said second PHY portion comprises a second USB PHY portion (USBPP), and said second input/output circuit comprises a second USB input/output (USBIO) circuit configured such that, when said power management device is operably coupled to a USB receptacle by way of a standard USB bus and said power management device is operably coupled to said first USBIO circuit by way of said transfer signal line of said low-voltage bus, a first driver circuit of said second USB input/output (USBIO) circuit re-transmits said Full Speed USB data signals and said Low Speed USB data signals received from said first USBIO circuit such that said re-transmitted Full Speed USB data signals and Low Speed USB data signals are transmitted onto standard USB data signal lines of said standard USB bus.

14. The system of claim 13,
wherein said SOC device is fabricated on a first semiconductor chip using a first technology node, and
wherein said power management device is fabricated on a second semiconductor chip using a second technology node.

15. The system of claim 13, wherein
said first terminals of said attenuation circuit are connected to said standard USB data signal lines and said second terminals of said attenuation circuit are connected to said low-voltage data signal lines of said low-voltage bus and said attenuation circuit is configured to attenuate received data signals transmitted on said standard USB data signal lines of said standard USB bus during USB data reception operations such that all of said attenuated received data signals are passed on said low-voltage data signal lines of said low-voltage bus to said first USBIO circuit with said maximum voltage levels of less than 2V,
wherein said first USBIO circuit further comprises a receiver circuit configured to receive said attenuated received data signals from said low-voltage data signal lines during said USB data reception operations, and to operably re-transmit corresponding received data signals to said USB control circuit.

16. The system of claim 15, wherein the first USBIO circuit further comprises a second driver circuit configured to generate High Speed USB data signals on said low-voltage data signal lines in response to associated High Speed data signals received from the USB control circuit during High Speed USB data transmission operations.

17. The system of claim 15, wherein the second driver circuit comprises a pull-up transistor and a pull-down transistor operably coupled between a 0.4V voltage source and ground, and being operably configured to generate said High Speed USB data signals on said low-voltage data signal lines in response to said associated High Speed data signals received from the USB control circuit during said High Speed USB data transmission operations.

18. The system of claim 13, wherein the first driver circuit comprises a pair of pull-up transistors and a pair of pull-down transistors operably coupled between a 3.3V voltage source and ground, and operably configured to generate one of said Full Speed USB data signals and said Low Speed USB data signals on said standard USB bus during an associated one of said Full Speed USB data transmission operations and said Low Speed USB data transmission operations.

19. The system of claim 18,
wherein said FS/LS output control circuit comprises first logic configured to assert a Full-Speed/Low-Speed output enable signal during said Full Speed USB data transmission operations and said Low Speed USB data transmission operations, and to de-assert said Full-Speed/Low-Speed output enable signal during said High Speed USB data transmission operations and data reception operations, and
wherein said first driver circuit comprises second logic configured to pass said associated one of said Full Speed data signals and said Low Speed data signals received from the USB control circuit to said pull-up transistor and said pull-down transistor only when said Full-Speed/Low-Speed output enable signal is asserted.

20. A computer program product including machine readable specifications of a first cell and a second cell, the specification of the first cell including computer readable parameters specifying structural features of a first interface PHY portion configured for instantiation in a System-on-Chip (SoC) device including a processor, the specification of the second cell including computer readable parameters specifying structural features of a second interface PHY portion configured for instantiation in a power management device associated with said SoC device, said specifications being executable by a computer running a placement process to control physical placement of the first interface PHY portion in said SoC device and placement of said second interface PHY portion in said power management device,
wherein the specification of the first cell comprises a first PHY portion that is configured for instantiation in said SoC device, said first PHY portion including a first input/output circuit and a control circuit, said control circuit being operably coupled between said processor and said first input/output circuit, said first input/output circuit including an output control circuit configured to transmit onto a transfer signal line of a low-voltage bus attenuated data signals received from said control circuit during associated data transmission operations, wherein said attenuated data signals are transferred onto said transfer signal line with first maximum voltage levels;
wherein the specification of the second cell comprises a second PHY portion that is configured for instantiation in said power management device, said second PHY portion including a second input/output circuit configured such that, when said power management device is operably coupled to a standard bus and said power management device is operably coupled to said first input/output circuit by way of said low-voltage bus, said second input/output circuit re-transmits said attenuated data signals received on said transfer signal line from said first input/output circuit such that said re-transmitted attenuated data signals are transmitted onto said standard bus with second maximum voltage levels that are higher than said first maximum voltage levels;
wherein the specification of said second cell includes an attenuation circuit having first terminals connected to said standard bus and second terminals connected to low-voltage data signal lines of said low-voltage bus, said low-voltage data signal lines extending in parallel with said transfer signal line between said first cell and said second cell, said attenuation circuit being configured to attenuate received data signals transmitted on said standard bus during data reception operations such that all of said attenuated received data signals are passed on said low-voltage data signal lines of said low-voltage bus to said first input/output circuit with maximum voltage levels of less than 2V.

* * * * *